(12) United States Patent
Weigand et al.

(10) Patent No.: US 9,405,600 B2
(45) Date of Patent: Aug. 2, 2016

(54) ELECTRONIC DEVICE TO PROVIDE NOTIFICATION OF EVENT

(71) Applicant: INTEL CORPORATION, Santa Clara, CA (US)

(72) Inventors: Benjamin S. Weigand, Hillsboro, OR (US); Phillip J. Sitbon, Portland, OR (US); Jameson H. Williams, Portland, OR (US); Jason Blanchard, Hillsboro, OR (US); Lakshman Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/142,621

(22) Filed: Dec. 27, 2013

(65) Prior Publication Data

US 2015/0186194 A1     Jul. 2, 2015

(51) Int. Cl.
*G06F 9/54* (2006.01)
*H04M 1/725* (2006.01)

(52) U.S. Cl.
CPC ........... *G06F 9/542* (2013.01); *H04M 1/72569* (2013.01)

(58) Field of Classification Search
CPC ... H04W 68/00; G06F 9/542; H04M 1/72569
See application file for complete search history.

(56) References Cited

U.S. PATENT DOCUMENTS

| | | | |
|---|---|---|---|
| 5,276,801 A | 1/1994 | Heyen et al. | |
| 6,421,725 B1 | 7/2002 | Vermilyea et al. | |
| 7,076,255 B2 * | 7/2006 | Parupudi | H04M 1/72563 455/414.1 |
| 8,233,943 B1 * | 7/2012 | Othmer et al. | 455/567 |
| 2002/0157017 A1 | 10/2002 | Mi et al. | |
| 2004/0259536 A1 * | 12/2004 | Keskar | H04M 1/72569 455/418 |
| 2006/0248183 A1 * | 11/2006 | Barton | 709/224 |
| 2008/0299954 A1 * | 12/2008 | Wright | H04W 4/02 455/414.1 |
| 2010/0056112 A1 * | 3/2010 | Dupont et al. | 455/412.2 |
| 2011/0029670 A1 | 2/2011 | Klein et al. | |
| 2013/0067014 A1 * | 3/2013 | Lau et al. | 709/207 |
| 2013/0078958 A1 * | 3/2013 | Kyprianou | 455/412.2 |
| 2013/0219409 A1 * | 8/2013 | Woley et al. | 719/313 |
| 2014/0087704 A1 * | 3/2014 | Decesaris et al. | 455/416 |

FOREIGN PATENT DOCUMENTS

| | | | | |
|---|---|---|---|---|
| KR | 10-0651597 B1 * | 11/2006 | | H04B 1/40 |
| KR | 10-2012-0052260 A | 5/2012 | | |

OTHER PUBLICATIONS

International Search Report and Written Opinion for Application PCT/US2014/067614 dated Mar. 4, 2015.

* cited by examiner

*Primary Examiner* — H S Sough
*Assistant Examiner* — Syed Roni
(74) *Attorney, Agent, or Firm* — KED & Associates LLP

(57) ABSTRACT

An electronic device may be provided that includes logic, at least partially implemented in hardware, to detect an occurrence of a blocking instance at the electronic device, and store information related to an event received at the electronic device, the event received during the blocking instance, in response to the occurrence of the blocking instance at the electronic device.

17 Claims, 3 Drawing Sheets

ELECTRONIC DEVICE TO PROVIDE NOTIFICATION OF EVENT

BACKGROUND

1. Field

Embodiments may relate to an electronic device to provide a notification.

2. Background

An electronic device may provide a notification to a user. The notification may be an audio notification or a display notification.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

Embodiments may relate to providing a notification from an electronic device. The electronic device may be any one of a mobile terminal, a mobile device, a mobile computing plafform, a mobile plafform, a laptop computer, a tablet, an ultra-mobile personal computer, a mobile Internet device, a smartphone, a personal digital assistant, a display device, a television (TV), and/or etc. For ease of discussion, the following may relate to a mobile terminal, although other electronic devices may also be used.

Embodiments may relate to delaying notifications based on information received at an electronic device. The notification may be delayed from being output based on a blocking instance (or a blocking event). The blocking instance may be any of a number of reasons, such as a call connection, an active telephone conversation, a video display, a game play and/or a user input at the electronic device. The blocking instance may be provided to delay the notification.

In at least one embodiment, a notification may be delayed when a user is on an active telephone conversation.

In at least one embodiment, a notification may be delayed when a user is engaged in an offline conversation (i.e., without the use of the electronic device). For example, a user may be in a meeting and may desire to avoid the outputting of notifications while at the meeting. The user may select a mode (by a user input) in which all notifications are delayed. In another example, the electronic device may determine that audible speech (or audible sound) is provided in an area around the electronic device, and the electronic device may thus delay the notification while the audible speech (or sounds) are provided around the electronic device.

Embodiments may display information immediately regarding a notification. Thus, if a user is viewing a screen of the electronic device, then the user may see the notification and may wait until they are not engaged in conversation before an alarm or beep is provided.

Figure 1:
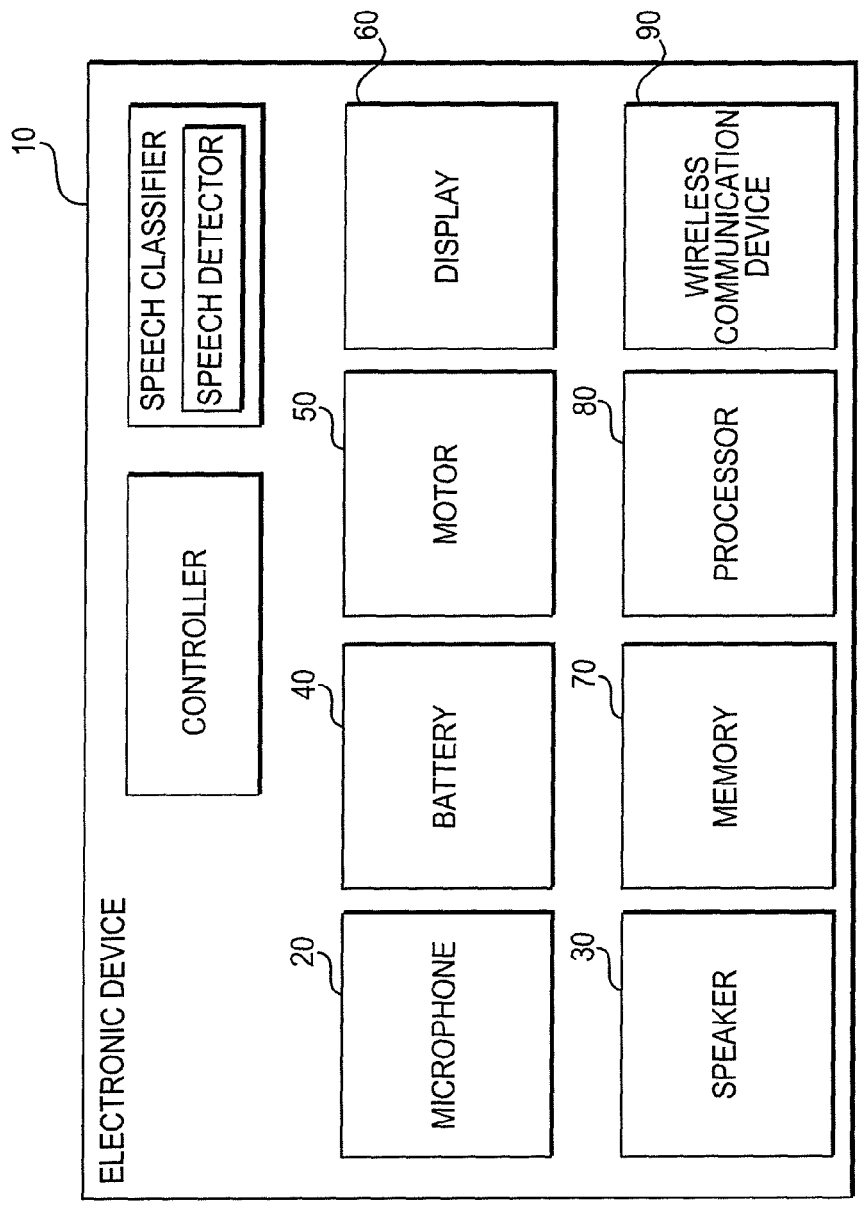
FIG. 1 is a diagram of an electronic device according to an example embodiment.

FIG. 1 is a diagram of an electronic device according to an example embodiment. Other embodiments and configurations may also be provided.

FIG. 1 shows an electronic device 10 that may include a microphone 20 (or an audio input device), a speaker 30 (or an audio output device), a battery 40 (such as in a battery port), a motor 50 (or haptic device), a display 60, a memory 70, a processor 80 and a wireless communication device 90. A controller may also be provided.

The electronic device may also include a speech classifier to determine if an audible sound is speech. In at least one embodiment, a classifier may take audio samples from a microphone and compare the samples against a pre-generated model. The classifier may recognize human speech, so that incoming samples may be matched against a model and a determination may be provided. The classifier may be considered a device having an algorithm that may be implemented in hardware or software.

The electronic device may receive wireless signals received through the wireless communication device 90. The signals may be processed and then output by the speaker 30 (so that a user may hear audio sounds) by the display 60 (so that the user may see an output) and by the motor 50 (so that the user may feel a haptic event).

A mobile terminal (or other electronic device) may receive an event (such as a notification from another terminal). For example, the electronic device may receive an event, such as an email, a text message, a short message service (SMS), another phone call, a post to a social media site, a calendar alert, etc. In other arrangements, a phone conversation with another terminal may be interrupted by the notification. The notification may be an audio notification, a video notification or a haptic notification.

As one example, User A (of electronic device A) and User B (or electronic B) may be involved in a wireless telephone call between electronic device A and electronic device B. During the active telephone call (or other activity), the electronic device A may receive a notification regarding information received from another device. In one arrangement, the phone conversation may be interrupted by an audio or video notification. This interrupt may be annoying to both User A and User B.

Embodiments may provide a methodology to avoid interrupting active telephone calls or other activities. In at least one embodiment, a determination may be made regarding whether a telephone call (or other activity or blocking event) is being performed. If the telephone call (or other activity or blocking event) is active, then information of the notification may be stored on the electronic device. Once the telephone call is no longer active, then the notification may be provided (or output). The notification may be provided as an audio notification, a visual notification or a haptic notification.

In at least one embodiment, logic at least partially implemented in hardware may detect an occurrence of a blocking instance at the electronic device. The logic at least partially implemented in hardware may store information related to an event received at the electronic device, when the event is received during the blocking instance, in response to the occurrence of the blocking instance.

The logic may further delay a notification of the received event. Additionally, the logic may further detect an end of the occurrence of the blocking instance, and provide the notification of the received event in response to the detected end of the occurrence of the blocking instance.

Embodiments may relate to avoiding other blocking activities, such as playing music, play games (at the electronic device), playing videos (at the electronic device), etc.

Figure 2:
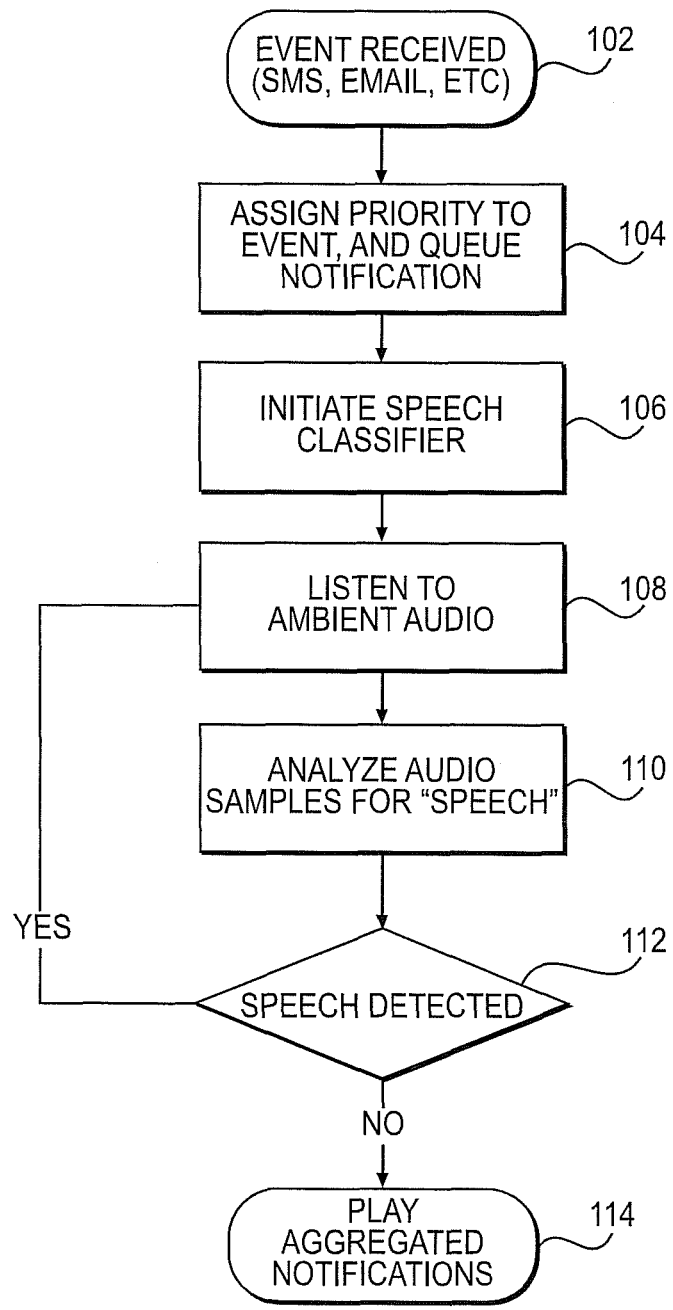
FIG. 2 is a flowchart of a methodology of providing a notification according to an example embodiment.

FIG. 2 is a flowchart of a methodology of providing a notification according to an example embodiment. Other operations, orders of operations and embodiments may also be provided.

FIG. 2 shows operations that may be performed by an electronic device. These operations may be performed by using a processor, a controller, logic, circuitry, and a memory of the electronic device.

In operation 102, an event may be received at the electronic device. The received event may be a text message, an incoming short message service (SMS), a multimedia message service (MMS), an email, a missed telephone call, tweets, a post to a social media site, a calendar event, an alarm, etc.

In operation 104, a priority may be assigned to the event and a queue notification may be provided. Events may be prioritized based on factors such as importance of the sender to the receiver (i.e., is it mom or dad), urgency of the message (based on an analysis of the text), frequency of repetition (such as in case of someone texting you 10 time in 5 minutes), etc.

A speech classifier may be initialized or operated in operation 106. The speech classifier may be part of the electronic device to determine if an audible sound is being provided. A speech classifier may include a speech detector. The speech classifier may determine if an audible sound is being provided via the speaker or the microphone, for example.

In operation 108, the speech classifier may receive and analyze any audible sound and provide a classification of the sound. The speech classifier may analyze any ambient audio sounds (i.e., audio sounds around the electronic device).

In operation 110, the audible sound may be analyzed by the speech classifier to determine if the audible sound is speech (such as from the speaker or the microphone).

In operation 112, a determination may be made whether a speech is detected from the analyzed audible sound. If the determination is NO in operation 112, then the process may proceed to operation 114. If the determination is YES in operation 112, then the process may proceed to operation 108.

In operation 114, the electronic device may provide the aggregated notifications (since the audible sounds are no longer being provided). For example, since no audible sound is being provided, the electronic device may provide an audio notification, a video notification and/or a haptic notification.

The electronic device may provide the notification in any of a number of different manners once there is no audible conversation (or other blocking instance). For example, the electronic device may output all of the stored notifications in a specific order (such as from a queue). In at least one example, the queue may be based on when the event occurred. In at least one example, the queue may be based on a different priorities assigned upon receipt at the electronic device.

In at least one embodiment, the stored notifications may be identified by a single sound, such as a beep, to inform a user that at least one notification is stored. The user may then perform an action in order to release at least one notification (or all the notifications).

In at least one embodiment, the stored notifications may be identified by a plurality of sounds, such as beeps, to inform a user that a plurality of notifications are stored.

In at least one embodiment, the stored notifications may be identified by a single object displayed on the display of the electronic device. The user may then select the single object (or another selectable object) in order to provide the notification (or all the notifications). The displayed object may be an icon representing at least one event.

In at least one embodiment, the stored notifications may be identified by a plurality of objects displayed on the display of the electronic device. The user may then select a specific one of the objects in order to receive the corresponding notification. Alternatively, the user may select another object which may then provide all the notifications.

In at least one embodiment, the display may display details of the received events. For example, the display may display information relating to a missed telephone call. The user may then be provided with information regarding the missed call.

Figure 3:
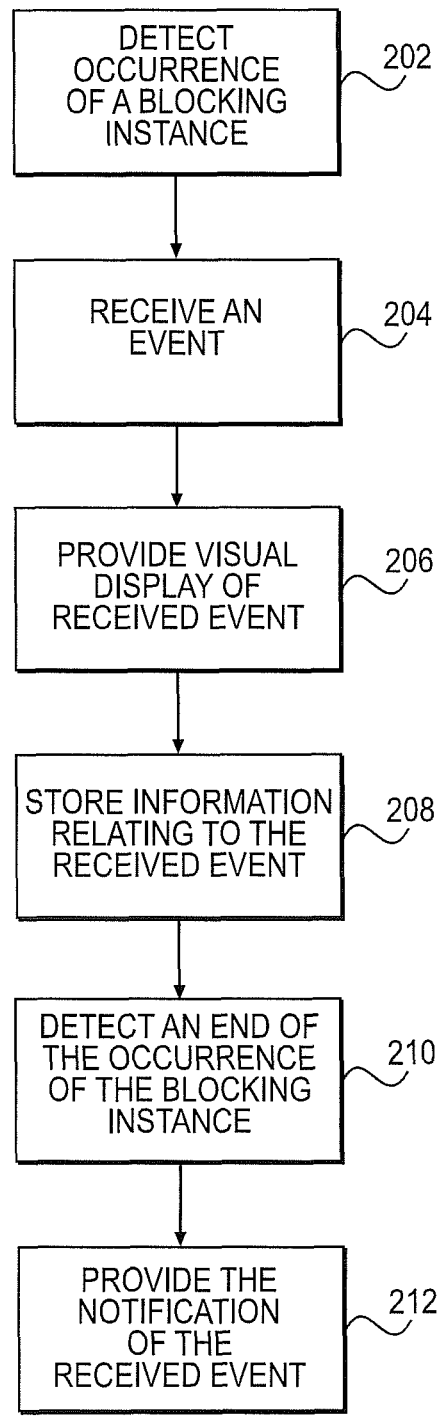
FIG. 3 is a flowchart of a methodology of providing a notification according to an example embodiment.

FIG. 3 is a flowchart of a methodology of providing a notification according to an example embodiment. Other operations, orders of operations and embodiments may also be provided.

FIG. 3 shows operations that may be performed by an electronic device. These operations may be performed by using a processor, a controller, logic, at least partially implemented in hardware, circuitry, and/or a memory of the electronic device.

In operation 202, occurrence of a blocking instance may be detected. The blocking instance may be a blocking event or a blocking activity. The blocking instance may be audible sounds (via the terminal or external to the terminal), selection of a mode of the terminal, etc. In operation 204, an event may be received at the electronic device. The received event may be a text message, an incoming short message service (SMS), a multimedia message service (MMS), an email, a missed telephone call, a tweet, a post to a social media site, a calendar event, an alarm, etc.

In operation 206, a visual display may be provided based on the received event. For example, a screen or a display may display information regarding the received event.

In operation 208, information regarding the received event may be stored. Information related to the event received at the electronic device may be stored when the event is received during the blocking instance, in response to the occurrence of the blocking instance.

In operation 210, an end of the blocking instance may be detected.

In operation 212, notification of the received event may be provided. That is, information, such as the notification, may be output. The information may be one notification or a plurality of notifications. The notification may be an audible sound or a display notification, for example.

In at least one embodiment, a machine-readable medium may store a program for controlling circuitry or logic to perform the above operations. The circuitry may be part of the processor, the microphone, the speaker and/or the display. The program may be stored in a system memory, which for example, may be internal or external to the electronic device. In at least one embodiment, the program may be part of a control algorithm for controlling operations of the processor.

Instructions or code executed by the processor may be provided to a memory from a machine-readable medium, or an external storage device accessible via a remote connection (e.g. over a network via an antenna and/or network interface) providing access to one or more electronically-accessible media, etc. A machine-readable medium may include any mechanism that provides (i.e., stores and/or transmits) information in a form readable by a machine (e.g., a computer). For example, a machine-readable medium may include random access memory (RAM), read-only memory (ROM), magnetic or optical storage medium, flash memory devices, electrical, optical, acoustical or other form of propagated signals (e.g., carrier waves, infrared signals, digital signals), etc. In alternative embodiments, hard-wired circuitry may be used in place of or in combination with the instructions or code, and thus the embodiments are not limited to any specific combination of hardware circuitry and software instructions.

The program may include code or instructions to perform any of the operations or functions performed in embodiments previously discussed above.

Elements of the above described embodiments may be provided in code segments or instructions to perform tasks. The code segments or tasks may be stored in a processor readable medium or transmitted by a computing data signal in a carrier wave over a transmission medium or communication link. The processor readable medium, machine readable medium or computer readable medium may include any medium that can store or transfer information. Examples of the processor readable medium, machine readable medium or computer readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The data signal may include any signal that can propagate over a transmission medium such as electronic network channels, optical fibers, air, electromagnetic, RF links, etc. The code segments or instructions may be downloaded via computer networks such as the Internet, Intranet, etc.

The following examples pertain to further embodiments.

Example 1 is an electronic device comprising: logic, at least partially implemented in hardware, to, detect an occurrence of a blocking instance at the electronic device, and store information related to an event received at the electronic device, the event received during the blocking instance, in response to the occurrence of the blocking instance at the electronic device.

In Example 2, the subject matter of Example 1 can optionally include the logic further to delay a notification of the received event.

In Example 3, the subject matter of Example 1 and Example 2 can optionally include the, wherein the logic further to detect an end of the occurrence of the blocking instance, and provide the notification of the received event in response to the detected end of the occurrence of the blocking instance.

In Example 4, the subject matter of Example 1 and Example 3 can optionally include the notification is a display notification.

In Example 5, the subject matter of Example 1 and Example 3 can optionally include the notification is an audible sound.

In Example 6, the subject matter of Example 1 can optionally include the blocking instance is an audible sound at the electronic device.

In Example 7, the subject matter of Example 1 can optionally include the blocking instance is an active telephone conversation.

In Example 8, the subject matter of Example 1 can optionally include the blocking instance is a user input at the electronic device.

In Example 9, the subject matter of Example 1 can optionally include a classifier to determine existence of the blocking instance.

In Example 10, the subject matter of Example 1 can optionally include a memory to store information regarding the received event.

In Example 11, the subject matter of Example 1 can optionally include the received event is receipt of a message at the electronic device.

In Example 12, the subject matter of Example 1 can optionally include the received event is receipt of a telephone call.

Example 13 is a method of an electronic device comprising: detecting an occurrence of a blocking instance at the electronic device, and storing information related to an event received at the electronic device, the event received during the blocking instance, in response to the occurrence of the blocking instance at the electronic device.

In Example 14, the subject matter of Example 13 can optionally include a delaying a notification of the received event.

In Example 15, the subject matter of Example 13 and Example 14 can optionally include the detecting an end of the occurrence of the blocking instance, and providing the notification of the received event in response to the detected end of the occurrence of the blocking instance.

In Example 16, the subject matter of Example 13 and Example 15 can optionally include the notification is an audible sound.

In Example 17, the subject matter of Example 13 and Example 15 can optionally include the notification is a display notification.

In Example 18, the subject matter of Example 13 can optionally include the blocking instance is an audible sound at the electronic device.

In Example 19, the subject matter of Example 13 can optionally include the blocking instance is an active telephone conversation.

In Example 20, the subject matter of Example 13 can optionally include the blocking instance is a user input at the electronic device.

In Example 21, the subject matter of Example 13 can optionally include the received event is receipt of a message at the electronic device.

In Example 22, the subject matter of Example 13 can optionally include the received event is receipt of a telephone call.

Example 23 is a machine-readable medium comprising one or more instructions that when executed cause a processor to perform one or more operations to: detect an occurrence of a blocking instance at an electronic device, and store information related to an event received at the electronic device, the event received during the blocking instance, in response to the occurrence of the blocking instance at the electronic device.

In Example 24, the subject matter of Example 23 can optionally include instructions that when executed cause the processor to delay a notification of the received event.

In Example 25, the subject matter of Example 23 can optionally include instructions that when executed cause the processor to detect an end of the occurrence of the blocking instance, and provide the notification of the received event in response to the detected end of the occurrence of the blocking instance.

In Example 26, the subject matter of Example 23 and Example 25 can optionally include the notification is an audible sound.

In Example 27, the subject matter of Example 23 and Example 25 can optionally include the notification is a display notification.

In Example 28, the subject matter of Example 23 can optionally include the blocking instance is an audible sound at the electronic device.

In Example 29, the subject matter of Example 23 can optionally include the blocking instance is an active telephone conversation.

In Example 30, the subject matter of Example 23 can optionally include the blocking instance is a user input at the electronic device.

In Example 31, the subject matter of Example 23 can optionally include the received event is receipt of a message at the electronic device.

In Example 32, the subject matter of Example 23 can optionally include the received event is receipt of a telephone call.

Example 33 is an electronic device comprising: means for detecting an occurrence of a blocking instance at the electronic device, and means for storing information related to an event received at the electronic device, the event received during the blocking instance, in response to the occurrence of the blocking instance at the electronic device.

In Example 34, the subject matter of Example 33 can optionally include the means for delaying a notification of the received event.

In Example 35, the subject matter of Example 33 and Example 34 can optionally include means for detecting an end of the occurrence of the blocking instance, and means for providing the notification of the received event in response to the detected end of the occurrence of the blocking instance.

In Example 36, the subject matter of Example 33 and Example 35 can optionally include the notification is an audible sound.

In Example 37, the subject matter of Example 33 and Example 354 can optionally include the notification is a display notification.

In Example 38, the subject matter of Example 33 can optionally include the blocking instance is an audible sound at the electronic device.

In Example 39, the subject matter of Example 33 can optionally include the blocking instance is an active telephone conversation.

In Example 40, the subject matter of Example 33 can optionally include the blocking instance is a user input at the electronic device.

In Example 41, the subject matter of Example 33 can optionally include the received event is receipt of a message at the electronic device.

In Example 42, the subject matter of Example 33 can optionally include the received event is receipt of a telephone call.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   logic, at least partially implemented in hardware, to:
   detect an occurrence of a blocking instance at the electronic device, the blocking instance including a determination of audible speech in an area external to the electronic device and wherein the audible speech is an offline conversation performed without using the electronic device;
   store information related to an event received at the electronic device, the event received during the blocking instance, in response to the occurrence of the blocking instance at the electronic device;
   delay a notification of the received event;
   detect an end of the audible speech in the area external to the electronic device; and
   provide the notification of the received event in response to the detected end of the audible speech in the area external to the electronic device.

2. The electronic device of claim 1, wherein the notification is a display notification.

3. The electronic device of claim 1, wherein the notification is an audible sound.

4. The electronic device of claim 1, wherein the blocking instance is an audible sound at the electronic device.

5. The electronic device of claim 1, further comprising a memory to store information regarding the received event.

6. The electronic device of claim 1, wherein the received event is receipt of a message at the electronic device.

7. The electronic device of claim 1, wherein the received event is receipt of a telephone call.

8. The electronic device of claim 1, wherein the logic further to:
   assign priority to each of a plurality of received events during the blocking instance; and
   store information relating to each of the received events with the corresponding assigned priority, and
   wherein to provide the notification includes to provide a plurality of notifications in a specific order based on a stored priority order of the plurality of received events.

9. The electronic device of claim 8, wherein the priority is based on importance of a sender of the received event.

10. The electronic device of claim 8, wherein the priority is based on urgency of a message.

11. The electronic device of claim 8, wherein the priority is based on frequency of repetition.

12. A method of an electronic device comprising:
    detecting an occurrence of a blocking instance at the electronic device, the blocking instance including a determination of audible speech in an area external to the electronic device wherein the audible speech is an offline conversation performed without using the electronic device;
    storing information related to an event received at the electronic device, the event received during the blocking instance, in response to the occurrence of the blocking instance at the electronic device;
    delaying a notification of the received event;
    detecting an end of the audible speech in the area external to the electronic device; and
    providing the notification of the received event in response to the detected end of the audible speech in the area external to the electronic device.

13. The method of claim 12, further comprising:
assigning priority to each of a plurality of received events during the blocking instance,
storing information relating to each of the received events with the corresponding assigned priority, and
wherein providing the notification includes providing a plurality of notifications in a specific order based on a stored priority order of the plurality of received events.

14. A non-transitory machine-readable medium comprising one or more instructions that when executed cause a processor to perform one or more operations to:
detect an occurrence of a blocking instance at an electronic device, the blocking instance including a determination of audible speech in an area external to the electronic device wherein the audible speech is an offline conversation performed without using the electronic device;
store information related to an event received at the electronic device, the event received during the blocking instance, in response to the occurrence of the blocking instance at the electronic device;
delay a notification of the received event;
detect an end of the audible speech in the area external to the electronic device; and
provide the notification of the received event in response to the detected end of the audible speech in the area external to the electronic device.

15. The non-transitory machine-readable medium of claim 14, comprising instructions that when executed cause the processor to:
assign priority to each of a plurality of received events during the blocking instance,
store information relating to each of the received events with the corresponding assigned priority, and
wherein provide the notification includes provide a plurality of notifications in a specific order based on a stored priority order of the plurality of received events.

16. An electronic device comprising:
means for determining a blocking instance based on determined audible speech in an area external to the electronic device and wherein the audible speech is an offline conversation performed without using the electronic device;
means for storing information related to an event received at the electronic device, the event received during the blocking instance, in response to the determination of the blocking instance based on determined audible speech in the area external to the electronic device;
means for delaying a notification of the received event;
means for detecting an end of the audible speech in the area external to the electronic device; and
means for providing the notification of the received event in response to the detected end of the audible speech in the area external to the electronic device.

17. The electronic device of claim 16, further comprising:
means for assigning priority to each of a plurality of received events during the blocking instance, and the means for storing to store information relating to each of the received events with the corresponding assigned priority, and the means for providing to provide a plurality of notifications in a specific order based on a stored priority order of the plurality of received events.

* * * * *